Sept. 29, 1964 R. KOMPFNER 3,151,325
ARTIFICIAL SCATTERING ELEMENTS FOR USE AS REFLECTORS
IN SPACE COMMUNICATION SYSTEMS
Filed Aug. 10, 1960
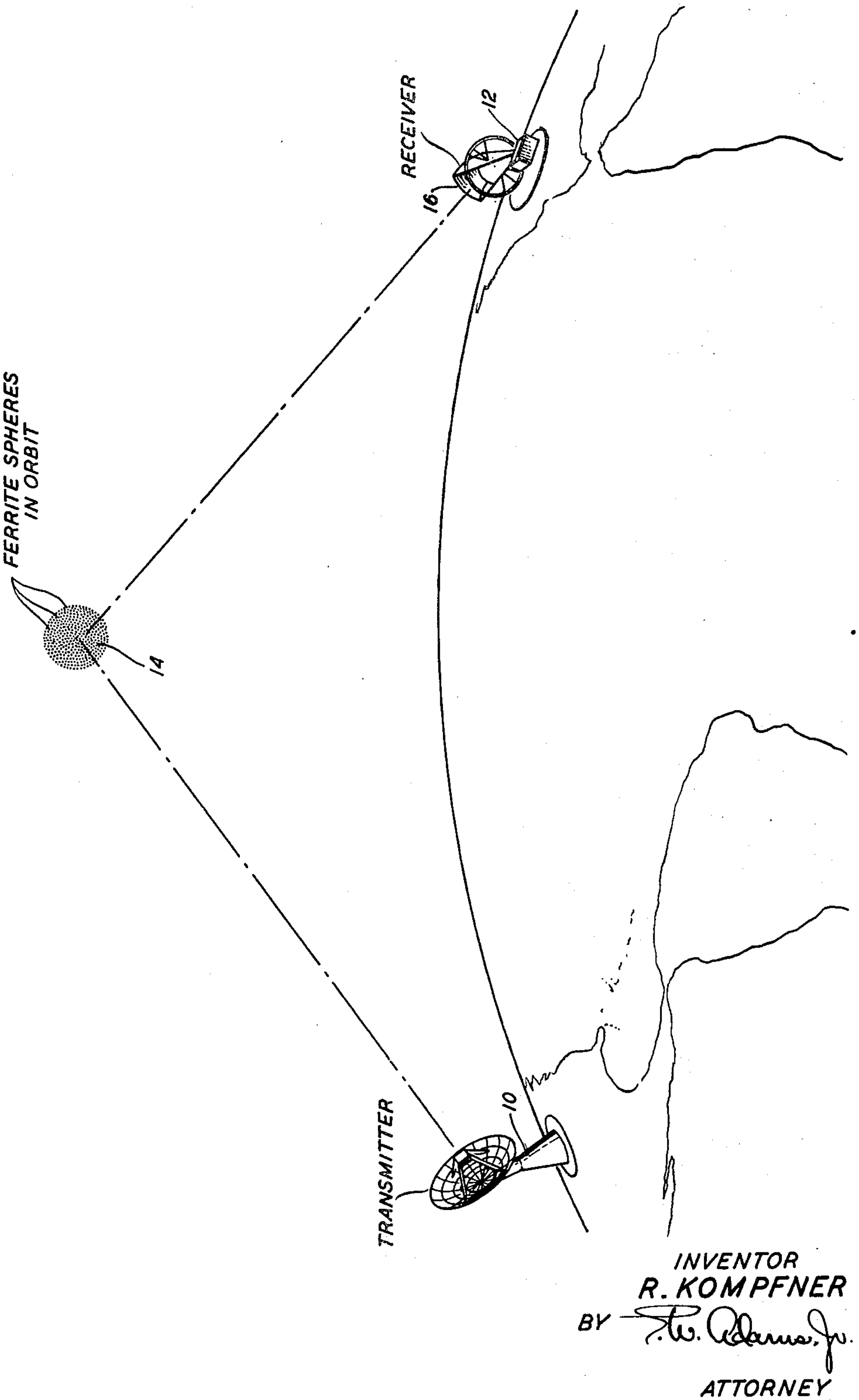
INVENTOR
R. KOMPFNER
BY F. W. Adams, Jr.
ATTORNEY

United States Patent Office 3,151,325

Patented Sept. 29, 1964

3,151,325

ARTIFICIAL SCATTERING ELEMENTS FOR USE AS REFLECTORS IN SPACE COMMUNICATION SYSTEMS

Rudolf Kompfner, Middletown, N.J., assignor to Bell Telephone Laboratories, Incorporated, New York, N.Y., a corporation of New York Filed Aug. 10, 1960, Ser. No. 48,780
5 Claims. (Cl. 343—18)

This invention relates to satellite communication systems and particularly to passive repeaters to be used at relay points in such systems.

With the successful launching of satellite vehicles in orbit, the possibility of using such vehicles as repeater stations in line-of-sight communication systems has led to many proposals involving highly sophisticated orbiting radio relay stations. For many purposes, however, a simple passive repeater interposed between transmitting and receiving terminals spaced at such distances that line-of-sight communication is otherwise impossible will serve quite satisfactorily. According to one arrangement now under investigation, a passive repeater for such a system comprises a metalized balloon about 100 feet in diameter which serves as an isotropic reflector of radio frequency waves radiated from the transmitter terminal of a communication system. Although, by its nature, such a reflector is of low efficiency, advances in the development of low-noise receivers are expected to make communication possible, using the relatively small amount of energy that such a repeater can redirect toward a distant receiver terminal. Such balloons, however, must be carried into orbit in a collapsed state and there inflated. These requirements pose many difficulties and an additional problem is found in the necessity of maintaining the balloon as a sufficiently perfect spherical reflector to prevent scintillations and other undesirable variations in the intensity of the reflected wave as seen at the receiver terminal.

In view of these difficulties, other forms of passive repeaters appear to have practical advantages and it has been proposed to use for such a repeater a cloud of half-wave dipole wires which may be dispersed in an orbit by relatively simple launching means. Depending upon the frequency at which communication is to be carried out, however, the wavelength and skin depth requirements on such dipoles result in almost impossibly fragile wires, if efficient reradiation is to be accomplished. Even where a penalty in efficiency is accepted and heavier wires are used, such wires have a relatively low ratio of mass-to-cross-sectional area. In the special environment of free space this characteristic is undesirable because the integrated action of solar radiation pressure is sufficient to spread the randomly oriented dipoles so that after an undesirably short time they are widely scattered rather than traveling in a relatively compact volume in a stable orbit.

It is accordingly the object of the present invention to improve passive repeaters for use in satellite communication systems and more particularly to reduce the difficulties of transport and erection of such repeaters in orbit and at the same time to improve long-term stability of the repeater once it has been placed in orbit.

In accordance with the above object, an orbiting satellite reflector for use as a passive repeater in a long-range radio relay system comprises a cloud of permanently magnetized ferrite spheres. Such spheres are of dimension such that the repeater comprises effectively a cloud of ferrite powder which has a high mass-to-cross-sectional area ratio and thus constitutes a relatively stable scattering reflector.

The above and other features of the invention will be considered in detail in the following specification taken in connection with the drawing, the single figure of which is a representation of a radio relay system utilizing an orbiting passive repeater according to the invention. The drawing is not to scale and the significant elements of the system are exaggerated in size to emphasize important features of the invention.

As shown in the drawing, a satellite communication system for line-of-sight radio relay service is typically employed to span a continent and/or a large body of water. Transatlantic communication is suggested in the drawing but it will be evident that the long-distance radio path may include both land and water masses with equal advantage. In its simplest form, such a system includes a transmitter station 10, a receiver station 12, and some form of reflector 14 launched in an orbit so chosen that for at least a portion of the time the reflector is directly visible from both the transmitting and receiving stations. If such an orbit is at an altitude of approximately 22,500 miles, the reflector satellite will appear to stand still with respect to the earth and thus to be continuously visible from both stations.

A typical transmitter station may include means for generating and modulating radio frequency energy having a carrier frequency of the order of five to ten kilomegacycles per second and an antenna shown in the drawing as comprising a very large paraboloidal reflector with appropriate waveguide feed and tracking means. The basic requirement placed upon such a transmitting station is that it shall illuminate the passive repeater with relatively high-level energy. Transmitter powers of the order of ten or more kilowatts are usually contemplated for use in such systems.

The receiver station includes a highly sensitive radio receiver, preferably one capable of operation at a low effective noise temperature. Such a receiver, for example, may advantageously include a horn reflector antenna 16 of the general type disclosed in Patent 2,416,675 to A. C. Beck et al., March 4, 1947, coupled to a maser amplifier. One of the characteristics of such a horn reflector antenna is its freedom from side and back lobes in its radiation pattern. It thus has a low effective noise temperature which is of a magnitude comparable to that of the best maser receiver input stages. It will be recognized that in any long-distance radio relay system of the type herein contemplated, only a very small amount of the energy radiated from the transmitter is available at the receiver. It is thus necessary, however sensitive the receiver may be, to optimize the characteristics of the passive repeater to obtain as high a signal level as possible at the receiver.

In accordance with the invention, the passive repeater 14 comprises a cloud or loosely defined mass of ferrite spheres. Although shown as occupying an essentially spherical volume, this distribution of the spheres is by way of example only and, in practical applications, it is expected that a more irregular array of individual reflecting spheres will occur. In any event, the material and the dimensions employed for the individual particles of such a cloud must be carefully chosen to obtain a sufficiently high ratio of reflected-to-incident wave energy. It will be understood that any suitable carrier may be employed to transport the ferrite spheres and to inject them into a desired orbit. Present rocket and satellite technology includes many suitable vehicles and launching techniques and it would appear obvious that the methods of placing the reflector in orbit and dispersing the ferrite spheres do not form a part of the present invention. By way of example, however, it would appear that the spheres might be carried into orbit by a relatively small rocket carrier and dispersed by an explosive charge triggered when the vehicle has been successfully injected in the desired orbit. Because of the high mass-to-effective cross-sectional area ratio provided by the ferrite particles, such a dispersed cloud of particles may be expected to remain as a relatively stable reflecting mass for long periods of time.

Choice of the optimum dimensions for the individual ferrite particles may be made in accordance with the following equations in which the notation given below will be used:

$h_o$—Magnetic intensity of incident radio wave
$h_r$—Magnetic intensity of reradiated wave
$h_i$—Net internal magnetic intensity
$m$—Total R-F magnetic moment of ferrite
$\chi$—Susceptibility of ferrite ($\mu-\mu_o$)
$v$—Volume of ferrite sphere
H—D.-C. magnetic intensity
$\omega$—Angular frequency
$\overline{E}$—Electric field intensity
$\overline{H}$—Magnetic field intensity
$\mu$—Permeability When a uniform plane circularly polarized wave falls on a ferrite sphere having its internal magnetic intensity directed along the direction of propagation of the wave and adjusted for gyromagnetic resonance, a transverse R-F magnetic moment is produced.

$$m=\chi v h_i \quad (1)$$

which is circularly polarized and lags $h_i$, the net internal magnetic intensity, by 90 degrees. The wave reradiated by this moment will have a magnetic intensity $$h_r=\omega m y \quad (2)$$

where $y$ is the "impedance" seen by the magnetic current moment $\omega m$. The effective internal magnetic intensity will be the difference between the incident and the reradiated intensities.

$$h_i=h_o-h_r=h_o-\omega y \chi v h_i \quad (3)$$

Hence $$h_i=\frac{h_o}{1+\omega y \chi v} \quad (4)$$

and $$m=\frac{\chi v h_o}{1+\omega y \chi v} \quad (5)$$

The radiated power is $$P_r=\omega m h_r$$

$$=(\omega m)^2 y=\left(\frac{\omega \chi v h_o}{1+\omega y \chi v}\right)^2 y$$

$$=\left(\frac{\omega y \chi v}{1+\omega y \chi v}\right)^2\left(\frac{h_o 2}{y}\right) \quad (6)$$

The power per square meter in the incident wave is $$|\overline{E}\times\overline{H}|=h_o^2\eta \quad (7)$$

where $\eta=120\pi$, the characteristic impedance of free space. Finally, the effective area of the ferrite sphere is $$A=\frac{P_r}{h_o^2\eta}=\left(\frac{\omega y \chi v}{1+\omega y \chi v}\right)^2\frac{1}{\eta y} \quad (8)$$

The magnetic impedance function $y$ can be derived from the radiation resistance of a small current loop and it turns out to be $$y=\frac{2\eta}{3}\frac{1}{\eta\lambda^2} \quad (9)$$

Substituting in Equation 8 and multiplying by the total number of spheres obtainable from the volume V, we obtain $$\Sigma A=\frac{V}{v}\frac{3\lambda^2}{2\eta}\left(\frac{\omega y \chi v}{1+\omega y \chi v}\right)^2 \quad (10)$$

It can be shown that $\Sigma$A will have a maximum when $$\omega y \chi v=1$$

and, therefore, $$v=\frac{1}{\omega y \chi} \quad (11)$$

By substitution of the expressions for $y$ and $v$ of Equations 9 and 11 in Equation 10 and simplification, $$\Sigma A=\frac{V f \chi}{240} \quad (12)$$

The above equations indicate the dimensions and the necessary permanent internal field required to place a ferrite sphere at gyromagnetic resonance for radio frequency waves of frequency $f$. At gyromagnetic resonance such a sphere will scatter waves strongly. If one assumes a radio frequency of ten kilomegacycles per second for use in the radio relay system, then at resonance the susceptibility will be given by $$\chi=\frac{Ms}{\Delta H}=4.28\times 10^{-3} \text{ webers/amp. meter}$$

for single crystal garnet ($Ms$=spin moment) and from Equation 12 the summed effective area of a cloud of spheres of total volume V will be $$\Sigma A=1.79\times 10^5 V \text{ meters}^2$$

Using these figures and Equation 11, the volume of an individual ferrite sphere will be $$v=2.01\times 10^{-10} \text{ meters}^3$$

and the corresponding diameter will be .0725 cm.

These are practically realizable dimensions and it is evident that the spacing between the individual spheres of the cloud comprising the repeater will be large as contrasted with the diameter of the individual spheres. This is a necessary condition for optimum reradiation of incident waves.

In view of the fact that the spacing between the individual spheres of the cloud is very large as contrasted with the diameter, and thus the magnetic field of the individual spheres, the cloud may be expected to remain dispersed for a considerable period. The forces acting between two magnetic dipoles, such as provided by the individual spheres, fall off as the fourth power of the distance between them. Other forces, such as those of radiation pressure or the earth's field, are probably greater. Further, if any pair of spheres does become coalesced through the action of the very small attractive force between them, the net magnetic field of the two is reduced substantially to zero by neutralization and the paired spheres no longer exert any significant force upon surrounding individual spheres. Nevertheless, at least one of the paired spheres will be oriented in such a manner as to resonate with incident electromagnetic radiation and thus to perform the requisite function as a reflecting element.

What is claimed is:

1. A reflector for use as a passive repeater in a microwave line-of-sight communication system comprising a cloud of spaced spheres of magnetically polarized material exhibiting the gyromagnetic effect at the frequency of signals to be transmitted.

2. In a communication system having transmitting and receiving stations at spaced locations, a passive repeater for redirecting energy radiated from the transmitting station toward the receiving station comprising, in orbit, a cloud of substantially spherical elements spaced at distances large as contrasted with their individual diameters and comprising magnetically polarized material exhibiting the gyromagnetic effect at the frequency of the signals radiated from said transmitting station.

3. In a long-range radio relay system, transmitting and receiving stations and an orbiting reflector comprising a plurality of substantially spherical elements of magnetically polarized material exhibiting the gyromagnetic effect at the frequency of signals from said transmitting station, said elements having an average volume chosen to optimize the net effective area of the reflector in accordance with the expression $$v=\frac{1}{\omega y \chi}$$

where $v$ is the volume of the cloud of elements, $\omega$ is the frequency, $y$ is the impedance experienced by the magnetic moment $\omega m$, $m$ is the total R-F magnetic moment of the material, and $\chi$ is the susceptibility of such material.

4. In a long-range radio system, transmitting and receiving stations and an orbiting reflector arranged to redirect energy from said transmitting station in the direction of said receiving station, said reflector comprising a cloud of substantially spherical elements of magnetically polarized material exhibiting the gyromagnetic effect at the frequency of signals from said transmitting station, said elements having an average volume given by the expression $$v = \frac{1}{\omega y \chi}$$

where $\omega$ is the angular frequency of the signals to be reflected, $y$ is the impedance experienced by the magnetic current moment $\omega m$, $m$ is the total R-F magnetic moment of the material, and $\chi$ is the susceptibility of said material.

5. A passive repeater for a line-of-sight communication system comprising for placement in orbit a cloud of substantially spherical elements of magnetically polarizable material exhibiting the gyromagnetic effect at the frequency of signals from said transmitting station, said elements having an average volume given by the expression $$v = \frac{1}{\omega y \chi}$$

where $\omega$ is the angular frequency of the signals to be reflected, $y$ is the impedance experienced by the magnetic current moment $\omega m$, $m$ is the total R-F magnetic moment of the material, and $\chi$ is the susceptibility of said material.

References Cited in the file of this patent

UNITED STATES PATENTS 2,871,344 Busignies -------------- Jan. 27, 1959